United States Patent

[11] 3,633,077

[72] Inventors Shigeo Tsuji
Fujisawa;
Shunji Shirouzu, Kawasaki, both of Japan

[21] Appl. No. 23,922
[22] Filed Mar. 30, 1970
[45] Patented Jan. 4, 1972
[73] Assignee Tokyo Shibaura Electric Co., Ltd.
Kawasaki-shi, Japan
[32] Priority Apr. 2, 1969
[33] Japan
[31] 44/25429

[54] SEMICONDUCTOR PHOTOELECTRIC CONVERTING DEVICE HAVING SPACED ELEMENTS FOR DECREASING SURFACE RECOMBINATION OF MINORITY CARRIERS
12 Claims, 4 Drawing Figs.

[52] U.S. Cl. 317/235 R, 317/235 N, 317/235 AM, 317/235 AU, 313/66
[51] Int. Cl. H01l 15/00, H01l 15/02
[50] Field of Search 317/235 AM, 235 N, 235 UA; 313/65 AB, 66

[56] References Cited

UNITED STATES PATENTS

| | | | |
|---|---|---|---|
| 3,458,782 | 6/1960 | Buck | 317/235 |
| 3,517,246 | 6/1970 | Chester | 313/66 |
| 3,403,284 | 9/1968 | Buck | 315/11 |
| 3,419,746 | 12/1968 | Crowell | 315/10 |

*Primary Examiner*—John W. Huckert
*Assistant Examiner*—Martin H. Edlow
*Attorney*—Flynn & Frishauf

ABSTRACT: A photoelectric converting device comprising a semiconductor substrate in one surface of which there are provided a plurality of junctions in a mosaic arrangement. In the portions of the opposite surface of said substrate which are in registration with and face said junctions is provided means to decrease effectively the surface recombination of minority carriers created due to the introduction of a light.

SEMICONDUCTOR PHOTOELECTRIC CONVERTING DEVICE HAVING SPACED ELEMENTS FOR DECREASING SURFACE RECOMBINATION OF MINORITY CARRIERS

BACKGROUND OF THE INVENTION

This invention relates to a photoelectric converting device and more particularly to a photosensitive storage target.

There is well known an image pickup tube in which there is used as a target a photoelectric converting device comprising a semiconductor substrate, for example, a silicon substrate, and a plurality of PN-junctions or PNP-junctions formed in one surface of the substrate in mosaic arrangement, each junction forming a picture element.

In this device, the opposite surface of said substrate receives incident light photons or energetic electrons representing a foreground object and then said first-mentioned surface of the substrate is scanned by a reading electron beam, so that an electric signal corresponding to said image may be obtained. In this case, the image signal is generated because the minority carriers in the electron-hole pairs created due to the introduction of a light (with an N-type substrate, the minority carrier is a hole) diffuse toward the PN-junctions fully reverse biased to be partially discharged therein and finally the scanning electron beam recharges the PN-junctions. An intensive effort has been made to improve the sensitivity of such a device. It has been found that the higher the recombination probability of minority carriers, the lower the sensitivity of the image pickup tube. For the purpose of increasing the sensitivity of such device, the patent of T. M. Buck et al., U.S. Pat. No. 3,458,782 issued July 29, 1969 and assigned to Bell Telephone Laboratories, Incorporated, describes a light sensitive storage device employing a diode array and establishing an impurity gradient in order to reduce the surface recombination velocity in a region of electron-hole pair production. The device of this type indeed has the advantage that the quantum efficiency increases with the resultant high sensitivity, but it has the disadvantage that its resolution is degraded as a result of lateral diffusion of minority carriers created on the light-receiving surface, especially except for the portions thereof corresponding to the PN-junctions. Thus, improved means are desired for improving the sensitivity without degrading the resolution.

SUMMARY OF THE INVENTION

A photoelectric converting device or target according to the invention comprises a plurality of PN-junctions formed in one surface of the substrate which is scanned by an electron beam, and means to decrease the surface recombination of minority carriers created therein due to the introduction of a light, the means being provided in the other surface of said substrate so as to face said junctions. Said means decreases the surface recombination of said minority carriers in the portions of said substrate corresponding to said PN-junctions without the lateral diffusion of the carriers to the other portions thereof, thereby increasing the sensitivity without degrading the resolution of the device.

DESCRIPTION OF THE PREFERRED EMBODIMENTS

Figure 1:
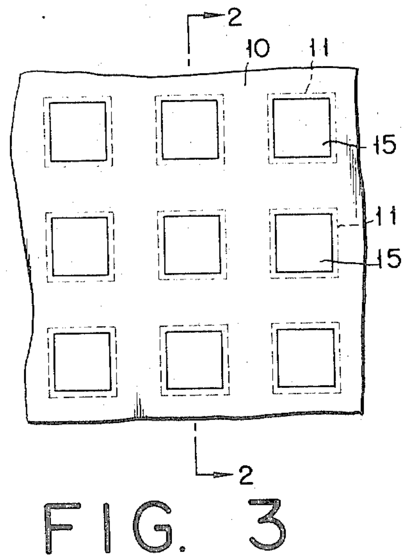
FIG. 1 is a plan view of a photoelectric converting device according to one embodiment of the present invention.

There will now be described one embodiment of the invention with reference to FIGS. 1 and 2.

General numeral 10 denotes an N-type silicon substrate, in one surface of which there are formed in mosaic arrangement a plurality of P-type island regions 11, each of which defines a PN-junction 12 with said substrate. The above-mentioned surface of the substrate is covered with an insulating film 13 such as a silicon dioxide film, except for the surface of said regions 11, an the exposed surface of said regions 11 as well as the P-type regions are covered with a semi-insulating layer 14. The layer 14 is made of such material as antimony triselenide, cadmium selenide or antimony trisulphide and is effective to prevent charge built up on the insulating film 13 from a scanning electron beam without the impairment of the camera tube operation. In the opposite surface of said substrate there are formed in mosaic arrangement a plurality of $N^+$-type thin layers 15 having the same type of conductivity as, but a higher impurity concentration than, said substrate so as to face the P-type regions 11. Each of said $N^+$-type layers is formed in a square form and corresponds to respective ones of said P-type regions. Consequently the impurity concentration gradient is established near the $N^+$-type regions 15 and causes the reduction of the surface recombination velocity by repelling the photoexcited minority carriers, so that said minority carriers (i.e., holes) created in the $N^+$-type region diffuse toward the corresponding P-type region. The dimensions of said $N^+$-type region are preferably equal to, or slightly smaller than, those of said P-type region.

In the device above described, when incident light photons representing a foreground object are introduced into the substrate from the light-receiving side thereof, the surface recombination of the photogenerated minority carriers in the $N^+$-type region 15 is smaller than in the other portions of the substrate, so that the minority carriers created in each $N^+$-type region may effectively reach the corresponding junction, and the minority carriers produced in the other portion of the substrate have a greater recombination probability and scarcely contribute to the photocurrent, thus increasing the sensitivity of the device without any reduction in resolution.

Figure 3:
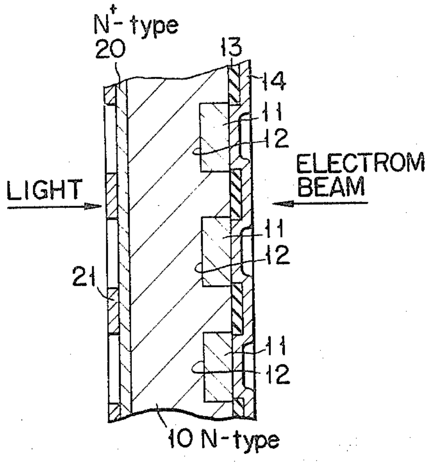
FIG. 3 is a sectional view of the device according to another embodiment of the invention.
Figure 4:
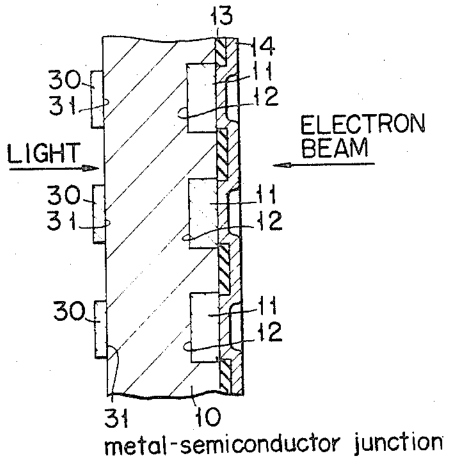
FIG. 4 is a sectional view of the device according to another embodiment of the invention.

Although the above described embodiment comprises a plurality of $N^+$-type regions formed on the light-receiving side of the substrate as means for decreasing the surface recombination of the minority carriers, there may be employed different arrangements as shown in FIGS. 3 and 4. In these figures, the same reference as numerals in the above embodiment are used to designate like portions and a detailed description thereof is omitted. The device shown in FIG. 3 includes a thin $N^+$-type layer 20 formed on the light-receiving side of the substrate 10 and a light impermeable or opaque film 21 formed on the exploded $N^+$-type layer except for the portions facing the PN-junctions 12, said $N^+$-type layer 20 and opaque film 21 constituting means to eliminate the undesirable generation of minority carriers, so as to improve the resolution of the devices. The opaque film 21 may be made of metal such as gold or aluminum, or other opaque insulating material. With a semiconductor substrate of high resistivity, it is convenient that said opaque film is formed of metal capable of being concurrently used as a signal electrode.

There will now be described by reference to FIG. 4 a device according to another embodiment of the invention, which employs barriers or junctions formed between the semiconductor substrate and the undermentioned metal. To describe in detail, where the semiconductor substrate 10 is of N-type conductivity, there is used a metal having a smaller work function than that of said semiconductor. For example, with an N-type silicon substrate, antimony (Sb) or aluminum (Al) may be used, while, with the semiconductor substrate of P-type conductivity, there is employed metal of a larger work function than that of said semiconductor, and a plurality of layers 30 made of said metal are disposed in contact with the light-receiving surface of the substrate so as to form a plurality of metal semiconductor junctions 31 or barriers between the metal layers and substrate. In this alternative case, the target operation can be done by establishing a scanning surface secondary emission ratio of greater than unity. The metal semiconductor junctions are, of course, arranged in mosaic form so as to respectively face said PN-junctions.

Figure 2:
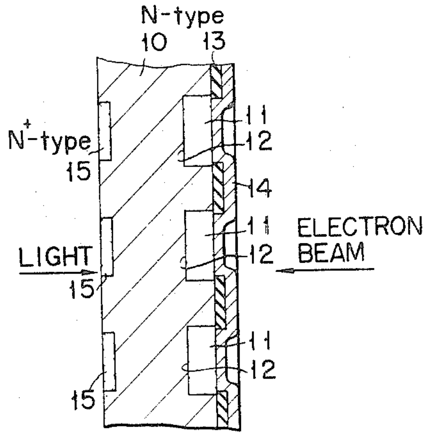
FIG. 2 is a sectional view taken along the line 2—2 of FIG. 1.

It will be noted that the photoelectric converting devices shown in FIGS. 3 and 4 have the same effect as those of FIGS. 1 and 2. Although the photoelectric converting device involved in all the foregoing embodiments is of such type as allows light photons representing a foreground object to be conducted to the light-receiving side of a semiconductor substrate, the present invention may be further applied to the conventional pickup tube which converts energetic electrons, X-rays or $\gamma$-rays representing a foreground object into the corresponding electric signals.

The semiconductor substrate may be made of other semiconductor materials, for example, germanium, silicon carbide, gallium phosphide, gallium arsenide and others in addition to silicon. The substrate may be of P-type conductivity, in which case a plurality of small island regions are formed in one surface of the substrate with N-type conductivity, and in the other surface of the substrate with $P^+$-type conductivity, respectively. The substrate may also have its opposite surfaces shaped flat as shown in the drawing, and to increase the mechanical strength, the substrate may have its end portion project from the periphery of its light-receiving surface or may be superposed upon another transparent substrate made of, for example, sapphire.

The junction for storing minority carriers may consist of a PNP-junction, NPN-junction, PIN-junction or Schottky barrier. What is claimed is:

1. A semiconductor photoelectric converting device which is scanned by an electron beam on a first surface thereof and which receives light on a second surface thereof comprising:

a semiconductor substrate (10) of a given conductivity type, one surface of which corresponds to said first surface which is scanned by said electron beam;

means (11) forming a plurality of spaced semiconductor junctions (12) in said substrate (10) and adjacent said one surface of said substrate (10) in a mosaic arrangement; and means including spaced elements disposed on the surface of said substrate opposite said one surface in registration with and facing said junctions (12), said opposite surface corresponding to said second surface of said converting device, for decreasing the surface recombination of minority carriers created in said converting device when impinged by light on said opposite surface of said substrate (10).

2. The device according to claim 1 wherein said means for decreasing the surface recombination of minority carriers comprises a plurality of spaced layers (15) formed in said opposite surface of said substrate (10) and having the same type of conductivity as, but a higher impurity concentration than, said substrate (10), each layer (15) corresponding to a respective junction (12).

3. The device according to claim 2 wherein the area of each of said layers (15) is not greater than the area of its respective junction (12).

4. The device according to claim 1 wherein said means for decreasing the surface recombination of minority carriers comprises a layer (20) of semiconductor material formed on said opposite surface of said substrate (10) and having the same type of conductivity as, but a higher impurity concentration than, said substrate (10), and an opaque film (21) formed on the surface of said layer (20) except for the portions of said layer (20) which are in registration with and facing said semiconductor junctions (12).

5. The device according to claim 4 wherein said opaque film is a metallic film.

6. The device according to claim 4 wherein said opaque film is an opaque insulating film.

7. The device according to claim 1 wherein said means for decreasing the surface recombination of minority carriers comprises a plurality of spaced metal layers (30) formed on said opposite surface of said substrate (10) in registration with and facing said junctions (12), each of said metal layers (30) defining a metal semiconductor junction (31) with said substrate (10), and each of said metal layers corresponding to a respective junction (12).

8. the device according to claim 7 wherein said substrate (10) is of N-type conductivity and said metal of said spaced metal layers (30) has a smaller work function than that of said substrate semiconductor material.

9. The device according to claim 7 wherein said substrate (10) is of P-type conductivity and said metal of said spaced metal layers (30) has a larger work function than that of said substrate semiconductor material.

10. The device according to claim 1 further including an insulating film (13) formed on said one surface of said substrate (10) except for the portions thereof corresponding to said junctions (12).

11. The device according to claim 10 further including a semi-insulating layer (14) formed on said insulating film (13) and on the portions corresponding to said junctions (12) on said one surface of said substrate (10).

12. The device according to claim 1 wherein said means forming said plurality of spaced semiconductor junctions includes plurality of spaced semiconductor regions (12) in said substrate (10) and having a conductivity type opposite to that of said substrate.

* * * * *